(12) United States Patent
Cocchi et al.

(10) Patent No.: US 9,854,820 B2
(45) Date of Patent: Jan. 2, 2018

(54) MACHINE AND METHOD FOR MAKING LIQUID AND/OR SEMI-LIQUID PRODUCTS

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.p.A. CARPIGIANI GROUP, Milan (IT)

( * ) Notice: Subject to any disclaimer, the term of this patent is extended or adjusted under 35 U.S.C. 154(b) by 113 days.

(21) Appl. No.: 14/744,918

(22) Filed: Jun. 19, 2015

(65) Prior Publication Data
US 2016/0174593 A1 Jun. 23, 2016

(30) Foreign Application Priority Data

Dec. 23, 2014 (IT) .............................. BO2014A0730

(51) Int. Cl.
*F25C 1/18* (2006.01)
*A23G 9/00* (2006.01)
(Continued)

(52) U.S. Cl.
CPC ............... *A23G 9/224* (2013.01); *A23G 9/08* (2013.01); *A23G 9/12* (2013.01); *A23G 9/228* (2013.01); *A23G 9/287* (2013.01)

(58) Field of Classification Search
CPC . A23G 9/224; A23G 9/12; A23G 9/08; A23G 9/228; A23G 9/287; A23G 9/222; A23G 9/28
(Continued)

(56) References Cited

U.S. PATENT DOCUMENTS 2,556,510 A * 6/1951 Topping .................. F25C 1/147
                                                        241/101.2
3,818,716 A * 6/1974 Carpigiani ............... A23G 9/16
                                                        426/519
(Continued)

FOREIGN PATENT DOCUMENTS

| EP | 0032460 | 7/1981 |
| EP | 2807930 | 12/2014 |
| GB | 1399784 | 7/1975 |

OTHER PUBLICATIONS

Italian Search Report dated Mar. 25, 2015 for related Italian Application No. B)20140730.

*Primary Examiner* — Joseph Trpisovsky
(74) *Attorney, Agent, or Firm* — Shuttleworth & Ingersoll, PLC; Timothy Klima

(57) ABSTRACT

A machine for making a liquid or semi-liquid product of the frozen type which includes a container for processing the liquid or semi-liquid product, provided with a loading opening; a stirrer positioned inside said container; a refrigeration system, provided with a heat carrying fluid, and comprising a heat exchanger, associated with said container; said container, stirrer and heat exchanger forming a batch freezing unit, a supplying unit for supplying a basic liquid product, associated with said container for releasing a basic liquid product designed to be mixed with a basic powder; closing means for the supplying unit, operatively acting on the supplying unit and capable of being activated and deactivated to allow supplying of the basic liquid product; a control unit, designed to control the refrigeration system, said stirrer and the closing means.

9 Claims, 4 Drawing Sheets

(51) Int. Cl.
*F25C 1/00* (2006.01)
*A23G 9/22* (2006.01)
*A23G 9/12* (2006.01)
*A23G 9/28* (2006.01)
*A23G 9/08* (2006.01)

(58) Field of Classification Search
USPC .......................................... 62/68, 342, 348
See application file for complete search history.

(56) References Cited

U.S. PATENT DOCUMENTS

| | | | |
|---|---|---|---|
| 3,858,498 A * | 1/1975 | Swenson | A23G 9/163 |
| | | | 62/342 |
| 4,169,359 A | 10/1979 | Weerstra | |
| 4,364,666 A | 12/1982 | Keyes | |
| 5,158,506 A | 10/1992 | Kusano et al. | |
| 6,173,117 B1 * | 1/2001 | Clubb | A47J 31/401 |
| | | | 222/146.5 |
| 6,637,214 B1 | 10/2003 | Leitzke et al. | |
| 2005/0081554 A1 | 4/2005 | Ross | |
| 2006/0110515 A1 * | 5/2006 | Waletzko | A23G 9/06 |
| | | | 426/565 |
| 2010/0122539 A1 * | 5/2010 | Cocchi | A23G 9/28 |
| | | | 62/1 |

* cited by examiner

MACHINE AND METHOD FOR MAKING LIQUID AND/OR SEMI-LIQUID PRODUCTS

This application claims priority to Italian Patent Application No. BO2014A000730 filed Dec. 23, 2014, which application is incorporated by reference herein.

BACKGROUND OF THE INVENTION

This invention relates to a machine and a method for making liquid and/or semi-liquid products.

In the technical sector concerned, there is a strong and widely felt need to be able to make artisan gelato even from mixtures in powder form.

Existing machines are adapted to allow making liquid or semi-liquid products from liquid or semi-liquid basic mixtures.

SUMMARY OF THE INVENTION

This invention therefore has for an aim to meet the above mentioned need.

A further aim of this invention is to provide a machine which allows making a frozen product (artisan gelato) in a manner which is simple and convenient for the operator, from a basic mixture in powder form.

This aim is achieved by a machine and a method for making liquid or semi-liquid products forming the object of the invention and comprising technical features as described herein.

BRIEF DESCRIPTION OF THE DRAWINGS

The technical features, with reference to the above aims, are clearly described in the present description and advantages thereof are also apparent from the present description, with reference to the accompanying drawings which illustrate a non-limiting example embodiment and in which.

DESCRIPTION OF THE PREFERRED EMBODIMENTS

Figure 1:
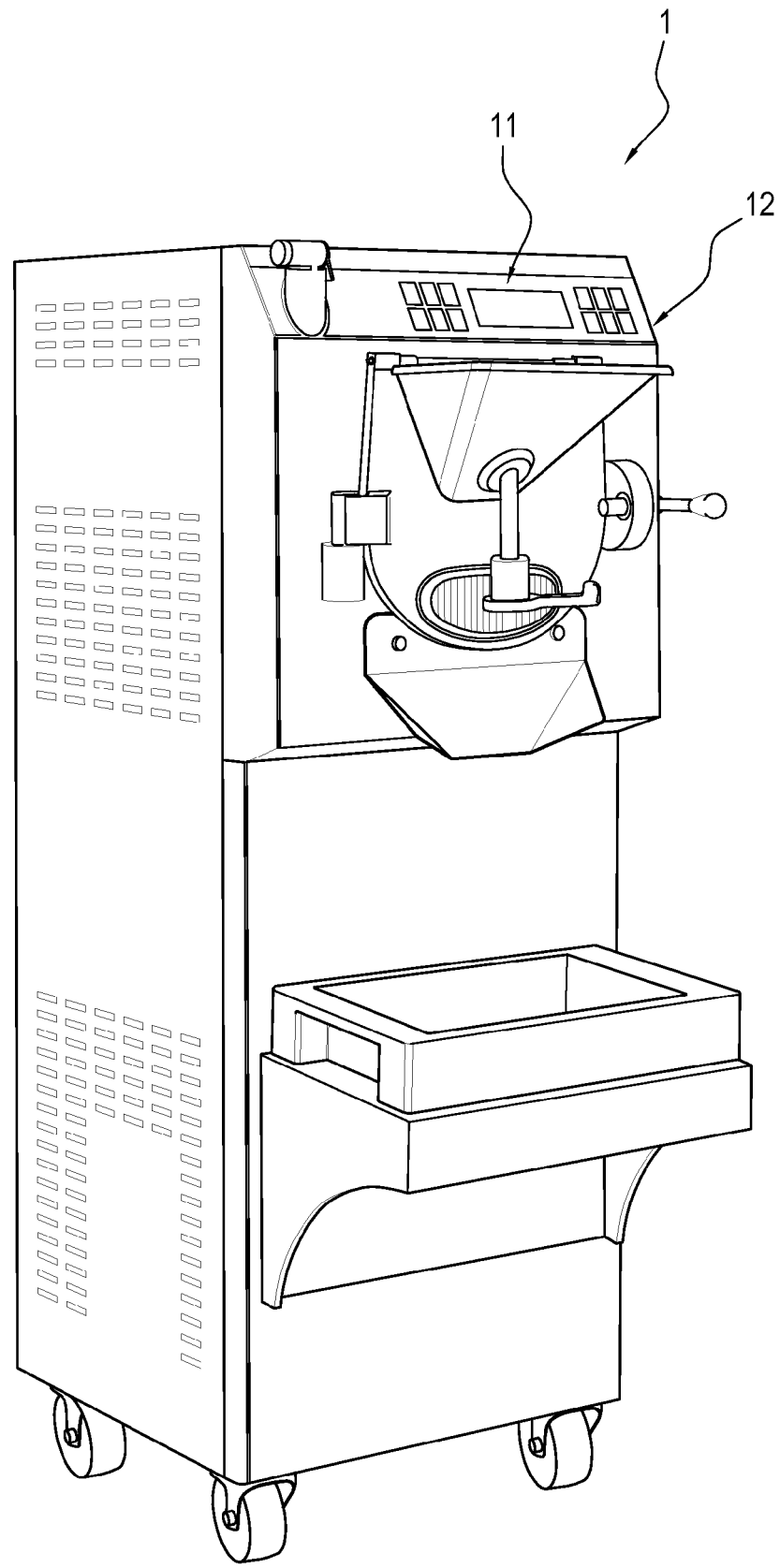
FIG. 1 is a schematic perspective view of a machine for making liquid or semiliquid products according to a first embodiment of this invention.

With reference to the accompanying drawings, the numeral 1 denotes a machine for making liquid or semi-liquid products of the frozen type (artisan gelato).

It should be noted that the machine 1 is an ice cream machine.

The machine 1 for making a liquid or semi-liquid products of the frozen type, comprises:
- a container 2 for processing the liquid or semi-liquid product, provided with a loading opening 3;
- a stirrer 4 positioned inside the container 2;
- a refrigeration system, provided with a heat carrying fluid, and comprising a heat exchanger 5, associated with said container 2, where said container 2, stirrer 4 and heat exchanger 5 define a batch freezing unit 6 (that is to say, an ice cream production unit),
- a supplying unit 7 for supplying a basic liquid product (preferably water), associated with said container 2 for releasing a basic liquid product designed to be mixed with a basic powder;
- closing means 8 for the supplying unit, operatively acting on the supplying unit 7 and capable of being activated and deactivated to allow supplying of the basic liquid product;
- a control unit 10, designed to control the refrigeration system, the stirrer 4 and the closing means 8.

More specifically, the control unit 10 drives the closing means 8 to release the basic liquid product.

According to one aspect of it, the machine 1 comprises a user interface 11 provided with commands, which can be activated by a user, for driving the closing means 8 for the supplying unit in such a way as to allow supplying of the basic liquid product.

Preferably, the user interface 11 is operatively connected to the control unit 10.

It should be noted that the user interface 11 may comprise a display and a command input device.

Preferably, the user interface may be made in the form of a touch-screen display designed to allow both displaying and command selection.

Preferably, the container 2 is a cylindrical container.

Preferably, the container 2 has a horizontal axis.

Still more preferably, the stirrer 4 is provided with scraping elements designed, in use, to wipe the inside wall of the container 2.

It should be noted that the stirrer 4 is configured to rotate about an axis of rotation (horizontal).

The control unit controls the refrigeration system in such a way that the product is maintained, at least during operation, at a temperature of between −15° C. and 0° C., so as to allow ice cream to be made.

Preferably—during processing—the control unit 10 drives the refrigeration system at the same time as it drives the stirrer 4, so as to cool and simultaneously mix the basic product inside the container 2, thereby allowing the increase in volume—overrun—necessary for the production of the ice cream.

In one embodiment, the supplying unit 7 is located inside the container 2.

In another embodiment, the supplying unit 7 is located outside the container 2 (at a hopper or loading duct of the container 2).

According to this aspect, the machine 1 comprises a feeding hopper 12 connected to the loading opening 3 and the supplying unit 7 is associated with (located inside) the feeding hopper 12.

It should also be noted that the machine 1 comprises a storage tank 13 for the basic liquid, and a connecting duct 14 connecting the storage tank 13 to the supplying unit 7.

The machine 1 may comprise transfer means (not illustrated), for example a pump, for transferring the basic liquid product from the tank 13 to the supplying unit 7.

According to another aspect, the closing means 8 comprise a valve.

Preferably, the supplying unit 7 comprises a nozzle.

With reference to the operation of the machine 1, the control unit 10 is preferably configured to activate movement of the stirrer after the command for activating the closing means for releasing the basic liquid.

The control unit 10 is configured to activate movement of the stirrer at the same time as the command for activating the closing means for releasing the basic liquid.

Thus, advantageously, the mixer is activated immediately, that is to say, at exactly the same time as the basic liquid is released.

According to another aspect (not illustrated), the machine 1 comprises a sensor for detecting the insertion of a powdered basic mixture in the container 2 (through the loading opening 3).

The control unit 10 is connected to the sensor and is configured to command opening of the closing means 8 for delivering the basic liquid through the supplying unit 7 when the sensor detects that a basic mixture has been loaded through the loading opening 3.

Below is a more detailed description of how the machine 1 operates and from which the technical and functional features of the machine may be better inferred.

It should be noted that according to the invention, the user loads a basic mixture in powder form into the container 2.

At this point, the basic liquid product (water) is supplied.

The powder mixture with the basic liquid added to it is now inside the container 2 and the stirrer 4 is activated to mix the powder and water together so that the powder mixture can adopt a liquid or semi-liquid consistency.

Advantageously, thanks to the machine 1, it is possible to load basic mixture in powder form to make ice cream (artisan gelato) in a very easy, safe and automated manner.

Figure 2:
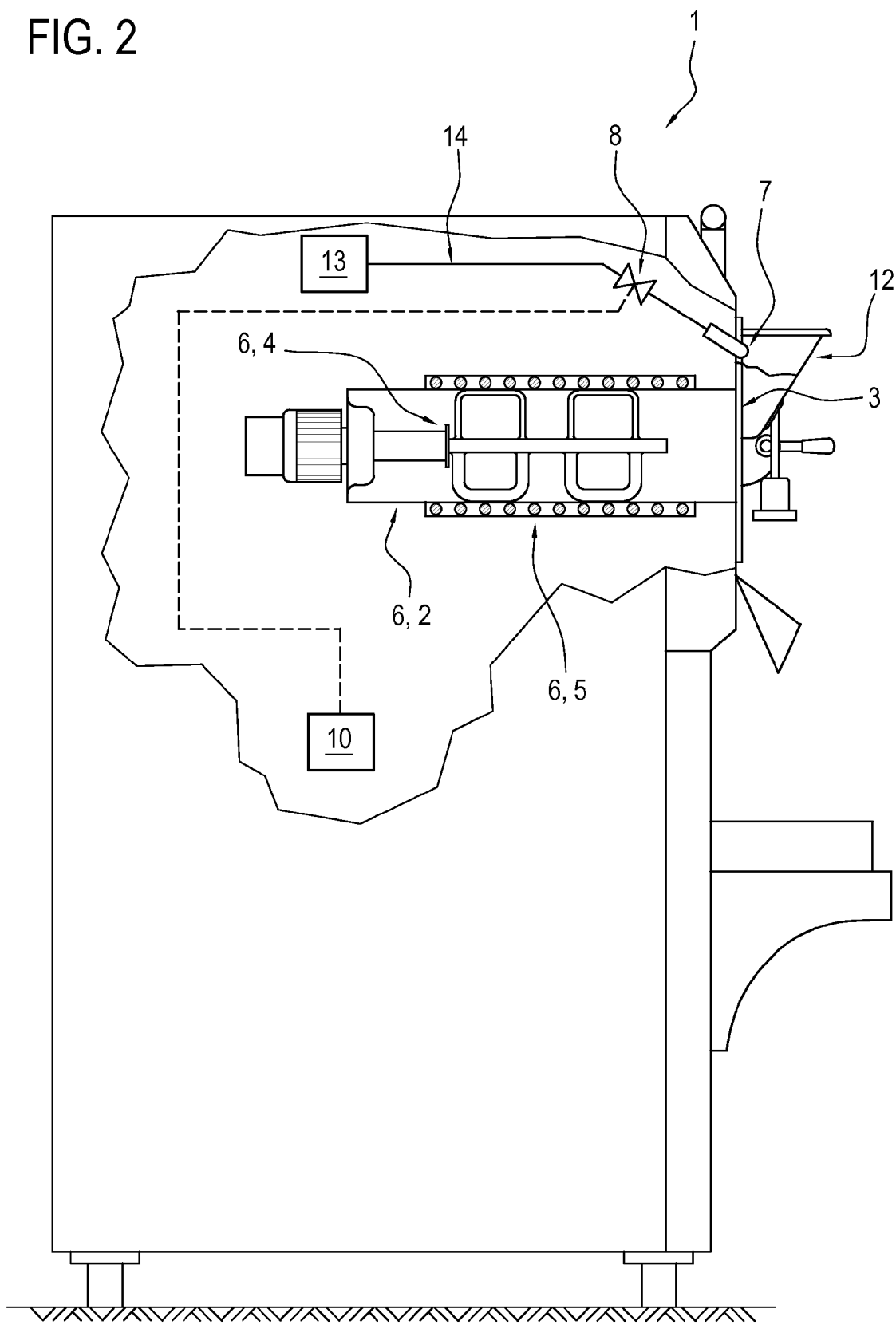
FIG. 2 is a schematic view of the machine of FIG. 1, forming the object of this invention, with some parts cut away in order to better illustrate others.
Figure 3:
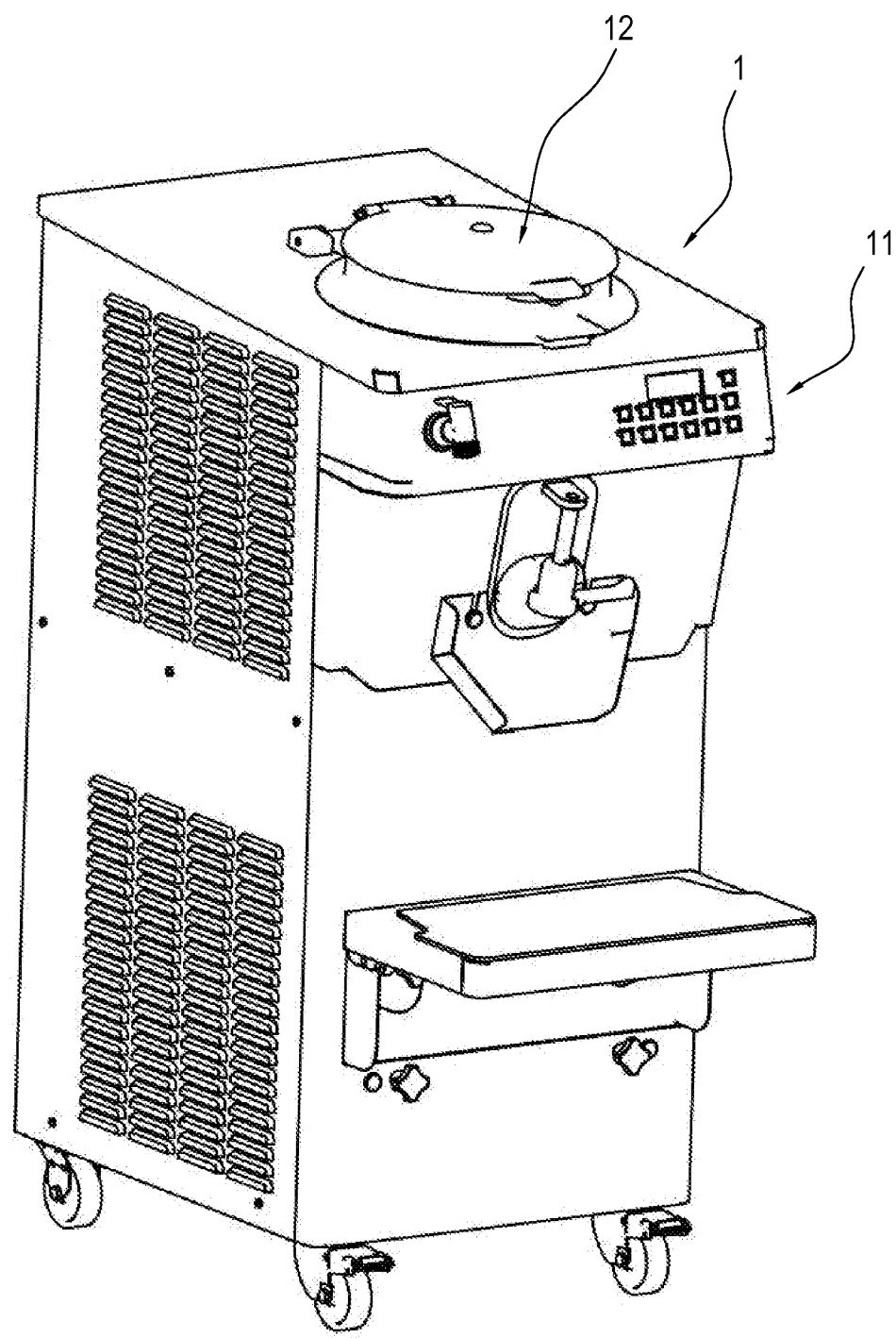
FIG. 3 is a schematic perspective view of a machine for making liquid or semiliquid products according to a second embodiment of this invention.
Figure 4:
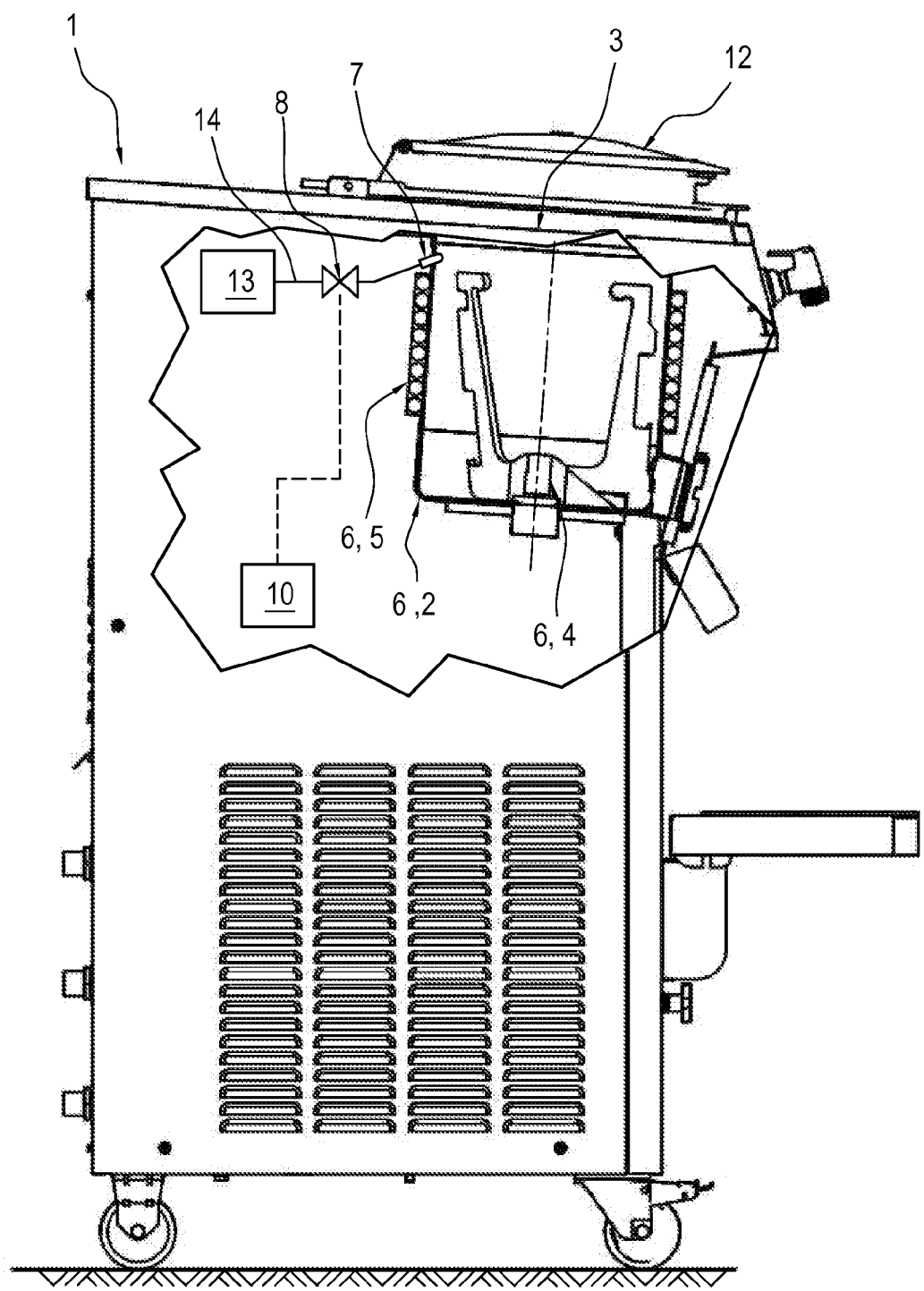
FIG. 4 is a schematic side view of the machine for making liquid or semi-liquid products illustrated in FIG. 3.

FIGS. 3 and 4 illustrate a further embodiment of the machine of FIGS. 1 and 2.

In this embodiment, the machine 1 has a container 2 whose axis is substantially vertical (or, at most, slightly inclined to the vertical).

The container is closed at the top by a lid which allows the powder mixture to be loaded into the container 2.

The nozzle 7 is positioned in such a way as to allow the basic liquid product to be released directly into the container 2.

All the considerations set above in connection with the machine of FIGS. 1-2 also apply substantially to this embodiment of the machine.

Also defined according to the invention is a method for making a liquid or semi-liquid product of the frozen type (artisan gelato), comprising the following steps:
preparing a batch freezing unit 6 comprising a container 2 for processing the liquid or semi-liquid product, provided with a loading opening 3 and a stirrer 4 which is positioned inside the container 2;
loading a powdered basic mixture into the batch freezing unit 6;
releasing, in contact with the basic mixture, a predetermined quantity of basic liquid in the batch freezing unit 6;
activating the stirrer 4 for mixing the powdered mixture with the basic liquid;
cooling the powdered mixture mixed with the basic liquid, and activating the stirrer 4 for making a product of the frozen type in the container 2.

With regard to the method described above, attention is drawn to the following.

Preferably, the loading opening 3 is a loading hopper connected to the processing container 2.

Preferably, the step of loading a powdered basic mixture into the batch freezing unit 6 (that is, into the container 2) comprises a step (concurrent with, that is, simultaneous with, the releasing of the powdered basic mixture) of activating the stirrer 4 in rotation in order to distribute the powder inside the container 2.

It should also be noted that the step of releasing, in contact with the basic mixture, a predetermined quantity of basic liquid in the batch freezing unit 6 (that is, in the processing container 2) preferably comes after the above mentioned steps of loading a powdered basic mixture into the batch freezing unit 6 and of activating the stirrer 4 in rotation in order to distribute the powder inside the container 2.

Preferably, the basic liquid is water or a water based mixture.

It should be noted that, preferably, the step of releasing, in contact with the basic mixture, a predetermined quantity of basic liquid in the batch freezing unit 6 (and more specifically, into the processing container 2) comprises a first releasing step where the basic liquid is released manually by the operator, that is, releasing is activated and controlled by the operator.

Preferably, the basic liquid is released through the loading opening 3 (preferably through the hopper).

That way, the operator cleans the loading opening 3 by means of the basic liquid.

It should be noted that the step of releasing, in contact with the basic mixture, a predetermined quantity of basic liquid in the batch freezing unit 6 also comprises a second releasing step where the basic liquid is released automatically.

It should be noted that, preferably, the basic liquid is released through the loading opening (that is, through the hopper).

Preferably, the basic liquid is released through a hose which can be handled by the operator.

During the second releasing step, the hose is hooked onto the machine frame so as to release the basic liquid into the container 2 (preferably through the loading opening). During the first releasing step, on the other hand, the operator moves the hose to a position where it releases the basic liquid into the loading opening 3.

It should be noted that the control unit of the machine 1 controls the basic liquid released during the first and second releasing steps as a function of the type of product being processed.

In other words, during the first and the second releasing steps, the quantities of basic liquid released are predetermined as a function of the type of product being processed (that is, depending on the type of product selected by the user by means of an interface).

The method accordingly comprises a step of selecting through an interface a processing program (preferably resident in the control unit).

The selected processing program sends a signal to the control unit.

The control unit regulates the quantity of liquid released during the first and second releasing steps as a function of the control signal received.

This advantageously avoids releasing too much or too little basic liquid for the powdered mixture being processed.

What is claimed is:
1. An ice cream machine for making a liquid or semi-liquid frozen product, comprising:
a container for processing the liquid or semi-liquid frozen product, the container including a loading opening for loading a basic powder into the container;
a stirrer positioned inside the container;
a refrigeration system, including a heat carrying fluid, and a heat exchanger, associated with the container;

the container, stirrer and heat exchanger forming a batch freezing unit, a supplying unit for supplying a basic liquid product, associated with the container for releasing the basic liquid product into the container for mixing with the basic powder loaded into the container;

a closing device for selectively operatively acting on the supplying unit between a mode of preventing release of the basic liquid product through the supplying unit into the container and a mode of allowing release of the basic liquid product through the supplying unit into the container;

a control unit, for controlling the refrigeration system, the stirrer and the closing device;

wherein the control unit is configured to cause the release of the basic liquid product into the container after the loading of the basic powder into the container and after activating the stirrer.

2. The machine according to claim 1, and further comprising a user interface including user commands selectable by the user for controlling the closing device to allow release of the basic liquid product.

3. The machine according to claim 1, wherein the supplying unit is positioned inside the container.

4. The machine according to claim 1, wherein the supplying unit is positioned outside the container.

5. The machine according to claim 4, and further comprising a feeding hopper connected to the loading opening, wherein the supplying unit is associated with the feeding hopper.

6. The machine according to claim 1, and further comprising a storage tank for the basic liquid product, and a connecting duct connecting the storage tank to the supplying unit.

7. The machine according to claim 1, wherein the closing device includes a valve.

8. The machine according to claim 1, wherein the supplying unit comprises a nozzle.

9. A method for making a liquid or semi-liquid frozen product, comprising:

preparing a batch freezing unit comprising a container for processing the liquid or semi-liquid frozen product, a loading opening for the container and a stirrer which is positioned inside the container;

loading a basic powder into the batch freezing unit through the loading opening;

selecting, through an interface, a processing program for processing the liquid or semi-liquid frozen product;

releasing, into contact with the basic powder, a predetermined quantity of basic liquid product into the batch freezing unit, the predetermined quantity being a function of the processing program;

activating the stirrer for mixing the basic powder with the basic liquid product;

cooling the basic powder mixed with the basic liquid product, and activating the stirrer for making the liquid or semi-liquid frozen product in the batch freezing unit;

wherein the releasing, into contact with the basic powder, the predetermined quantity of basic liquid product into the batch freezing unit comes after the loading the basic powder into the batch freezing unit and after the activating the stirrer.

\* \* \* \* \*